(12) United States Patent
Daughertty

(10) Patent No.: US 7,597,271 B2
(45) Date of Patent: Oct. 6, 2009

(54) APPARATUS FOR DISPERSING LIQUIDS AND SPRAY DEVICE THEREFOR

(75) Inventor: William T. Daughertty, Bristol, TN (US)

(73) Assignee: Magic Wand, Inc., Bristol, VA (US)

( * ) Notice: Subject to any disclaimer, the term of this patent is extended or adjusted under 35 U.S.C. 154(b) by 442 days.

(21) Appl. No.: 11/149,535

(22) Filed: Jun. 10, 2005

(65) Prior Publication Data

US 2006/0278732 A1    Dec. 14, 2006

(51) Int. Cl.
B05B 3/02        (2006.01)
B05B 3/00        (2006.01)
B05B 15/06       (2006.01)
B08B 3/02        (2006.01)
B08B 3/04        (2006.01)

(52) U.S. Cl. .................... 239/209; 239/263.1; 239/751; 134/123; 134/181; 134/198

(58) Field of Classification Search ................. 239/751, 239/209, 207, 263.1, 208, 225.1, 227, 246, 239/248, 251, 261, 264, 273, 548, 750, 752, 239/753; 134/123, 198, 172, 181, 179, 180
See application file for complete search history.

(56) References Cited

U.S. PATENT DOCUMENTS

| 3,561,398 | A | | 2/1971 | Rose et al. |
| 3,883,073 | A | | 5/1975 | Ballu |
| 4,659,018 | A | | 4/1987 | Shulman |
| 4,662,565 | A | | 5/1987 | Waldrum |
| 4,744,517 | A | | 5/1988 | Iwamoto et al. |
| 4,761,039 | A | | 8/1988 | Hilaris |
| 4,811,902 | A | | 3/1989 | Nagata |
| 4,920,997 | A | * | 5/1990 | Vetter et al. ............... 134/57 R |
| 5,103,761 | A | | 4/1992 | Ishibashi et al. |
| 5,104,044 | A | * | 4/1992 | Ratell, Jr. .................... 239/240 |
| 5,188,293 | A | * | 2/1993 | Burton ......................... 239/1 |
| 5,577,288 | A | * | 11/1996 | Stinnett et al. ............... 15/97.3 |
| 5,853,127 | A | * | 12/1998 | Heembrock ................. 239/227 |
| 5,865,374 | A | | 2/1999 | Barta et al. |
| 5,938,123 | A | | 8/1999 | Heitzman |
| 6,502,765 | B1 | * | 1/2003 | Chase ......................... 239/227 |
| 6,619,564 | B1 | | 9/2003 | Brown |
| 2001/0038039 | A1 | | 11/2001 | Schultz et al. |
| 2004/0065349 | A1 | * | 4/2004 | Scheiter, Jr. .................. 134/18 |

* cited by examiner

Primary Examiner—Darren W Gorman
(74) Attorney, Agent, or Firm—Novak Druce & Quigg LLP

(57) ABSTRACT

An apparatus for dispensing a liquid onto a vehicle generally consisting of an inverted, U-shape support frame providing a space for receiving a vehicle therethrough; at least one liquid dispensing device supported on said frame, having a shaft provided with a longitudinally disposed first passageway section communicable at one end thereof with a source of liquid under pressure, a second passageway section communicating with the first passage section and disposed at an angle relative thereto and a plurality of third passageway sections communicating with the second passageway section, spaced circumferentially and each disposed at an angle relative to a longitudinal centerline of the second passageway; and means for rotating the shaft about a longitudinal centerline thereof.

5 Claims, 2 Drawing Sheets

APPARATUS FOR DISPERSING LIQUIDS AND SPRAY DEVICE THEREFOR

This invention relates to an apparatus for dispersing a liquid, and more particularly to such an apparatus suitable for dispersing a liquid onto a vehicle for purposes of cleaning and/or applying a wax solution to the vehicle. The invention further contemplates a liquid spraying device utilized in such an apparatus.

BACKGROUND OF THE INVENTION

Systems for cleaning vehicles by dispersing cleaning agents, wax solutions and rinse water on such vehicles typically are of a tunnel or roll-over type. In a tunnel type of such system, there usually is provided an inverted U-shaped support structure which is stationary and equipped with an array of nozzles for spraying cleaning agents, wax preparations and rinse water onto vehicles advanced through the opening of such structures. In a roll-over type system, a similar frame structure is utilized but the vehicle being cleaned is maintained stationary and the support frame is advanced along a set of rails over the vehicle, usually first in one direction and then in the opposite direction. In either of such types of systems, it is desirable to disperse a liquid in a manner so that a maximum amount of surface of the vehicle being washed is covered. To provide such maximum coverage, it has been found to be highly effective to apply a spray pattern from a liquid dispersing nozzle along an orbital path with the individual streams of liquid projecting at different angles.

In the prior art, there have been a number of orbital spray devices employed in car cleaning systems which are highly effective in dispersing a liquid onto a vehicle being cleaned, over a large area. Such devices, however, have been found to be comparatively complicated in design and therefore relatively expensive to manufacture. Accordingly, it is the principal object of the present invention to provide an apparatus operable to disperse a liquid such as a cleaning agent, a wax preparation or rinse water onto a vehicle, utilizing an array of devices for dispersing sprays of liquid in orbital patterns which are comparatively simple in design, relatively inexpensive to manufacture, highly effective in performance and reliable, and which require a minimal amount of maintenance.

SUMMARY OF THE INVENTION

The principal objectives of the present invention are achieved by providing a fluid dispensing device mountable on a support frame of a vehicle washing system of the types described, generally consisting of a shaft including a main body section provided with a longitudinally disposed passageway section communicable at one end thereof with a source of liquid under pressure and a head section provided with a second passageway section communicating with the first passageway section and disposed at an angle relative thereto and at least one third passageway section communicating with the second passageway section, disposed at an angle relative to a longitudinal centerline of the second passageway section and having an outlet; means for rotating the shaft about a longitudinal centerline thereof; and means for mounting such shaft and the means for rotating the shaft on such support frame. Preferably, a plurality of such third passageway sections, circumferentially spaced relative to the longitudinal centerline of the second passageway section, is provided, along with a nozzle inserted in each of the outlets of such third passageway sections. Upon rotation of such a device about the longitudinal axis of the shaft thereof, and supplying a liquid under pressure therethrough, such liquid will be dispersed along an orbital path covering a circular or annular area.

BRIEF DESCRIPTIONS OF THE DRAWINGS

DETAILED DESCRIPTION OF PREFERRED EMBODIMENTS OF THE INVENTION

Figure 1:
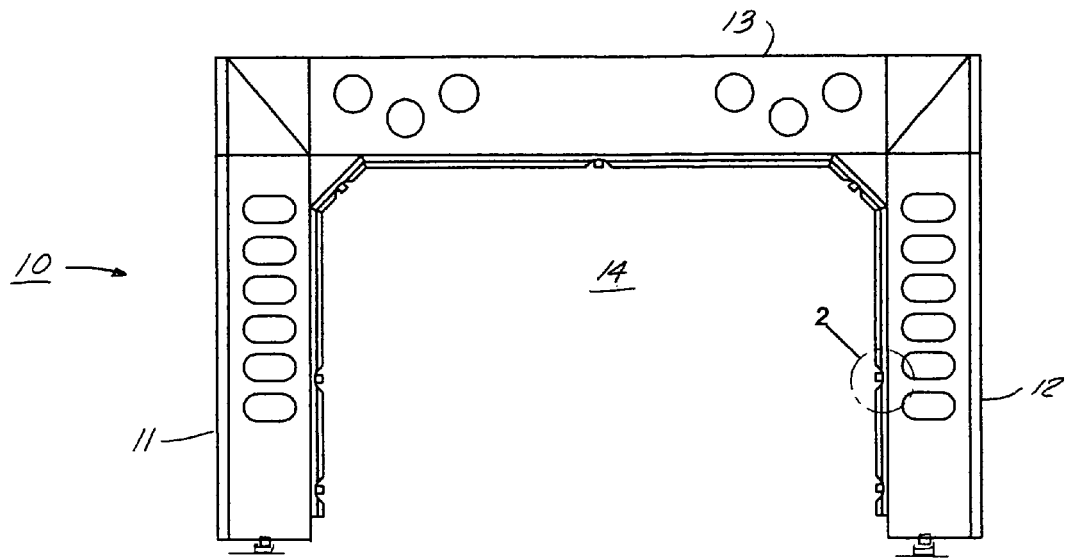
FIG. 1 is a front elevational view of a support frame adapted to be used in either a tunnel or roll-over type of vehicle wash system embodying the present invention.

FIG. 1 of the drawings illustrates a support frame 10 commonly used in both tunnel and roll-over type vehicle wash systems. It generally consists of a pair of laterally spaced leg sections 11 and 12 interconnected at the upper ends thereof by a spanning section 13, defining an opening 14 in or through which a vehicle may be positioned or advanced. In tunnel type systems, the support frame would be stationary and in roll-over type systems the leg sections thereof would be provided with sets of rollers mounted on a pair of longitudinally disposed, laterally spaced rails along which the support frame may be displaced. The principal function of such frame is to hold various mechanisms for applying cleaning preparations, wax solutions and rinse water onto vehicles being cleaned, and also for directing streams of air thereon for drying solutions applied to the vehicles. Mounted on the inner sides of the leg and spanning sections of the support frame and spaced along the periphery of opening 14 is a set of liquid dispensing devices 15 which are operable to disperse a liquid solution such as a cleaning preparation, wax or rinse water onto the body of a vehicle disposed within opening 14, in an orbital pattern covering a circular or annular area.

Figure 2:
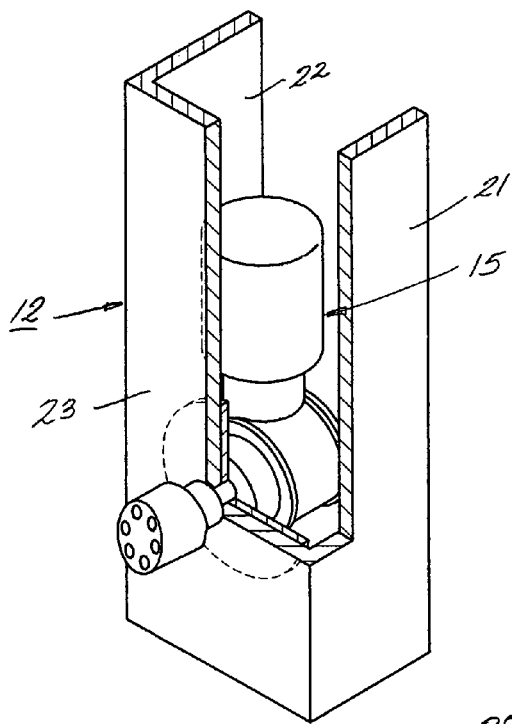
FIG. 2 is a fragmentary perspective view of a leg portion of the support frame shown in FIG. 1, designated by the reference numeral 2, having a portion thereof broken away, illustrating a liquid dispensing device embodying the present invention.
Figure 3:
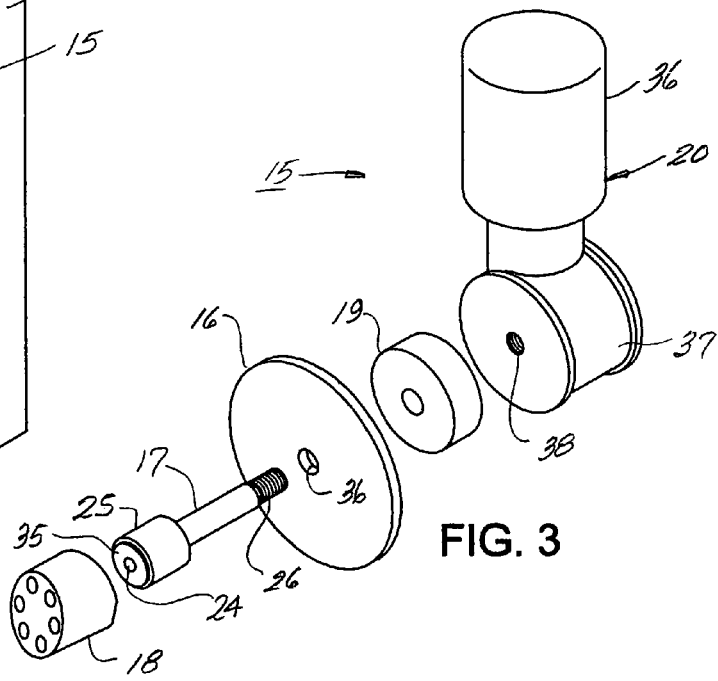
FIG. 3 is an enlarged perspective view of the liquid dispensing device shown in FIG. 3, illustrating the components thereof in exploded relation.
Figure 4:
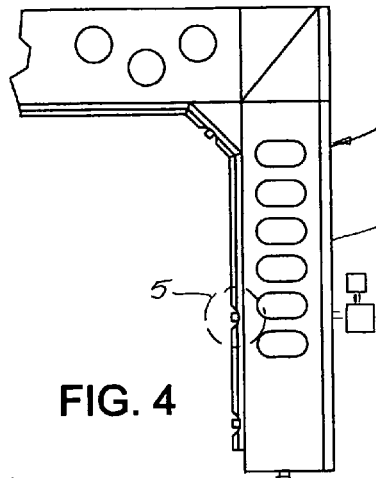
FIG. 4 is a view similar to the view shown in FIG. 1, having a portion thereof broken away.
Figure 5:
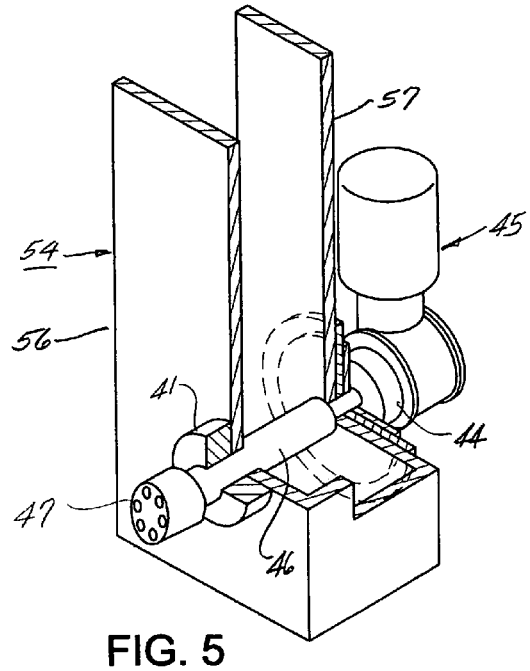
FIG. 5 is an enlarged perspective view of a leg portion of the support frame shown in FIG. 4, designated by the numeral 5, having a portion thereof broken away, illustrating a modified liquid dispensing device embodying the present invention.
Figure 7:
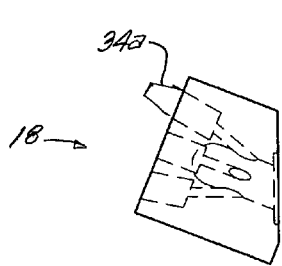
FIG. 7 is an enlarged side elevational view of the head section of the devices shown in FIGS. 2 through 6.
Figure 8:
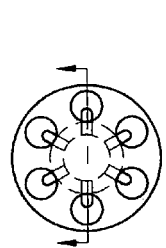
FIG. 8 is a front elevational view of the head section shown in FIG. 7.
Figure 9:
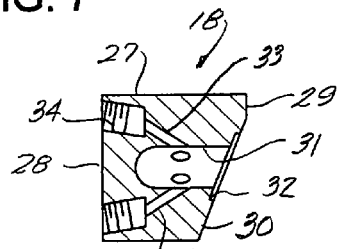
FIG. 9 is a vertical section taken along line 9-9 in FIG. 8.
Figure 6:
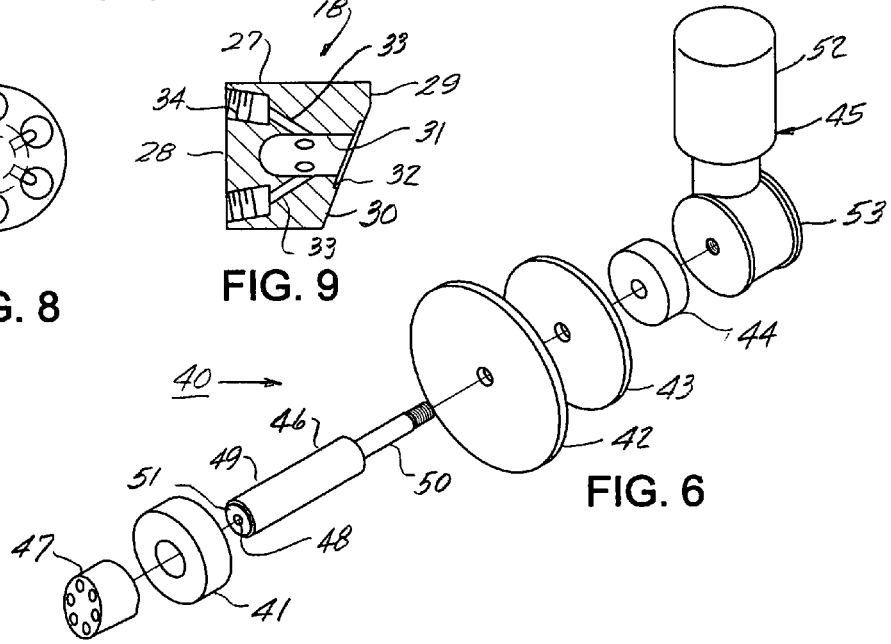
FIG. 6 is a perspective view of the device shown in FIG. 5, illustrating the components thereof in exploded relation.

As best seen in FIG. 3, each of such devices includes a mounting plate 16, a shaft 17 having a main body section and head section 18, a spacer 19 and a drive unit 20. Each of such devices is adapted to be mounted in a leg or spanning section of frame 10 as shown in FIG. 2 which illustrates a portion of leg section 12 having forwardly and rearwardly disposed wall portions 21 and 22 and an interconnecting inner wall 23. Shaft 17 consists of tubular member providing an axially disposed fluid passageway 24, having an enlarged head portion 25 and a threaded end portion 26 as best shown in FIGS. 7 through 9. Head section 18 is provided with a cylindrical side wall 27, front and rear walls 28 and 29 disposed substantially perpendicular to the longitudinal centerline of the section, and a rear, planar wall section 30 disposed at an acute angle relative to rear end wall 29 and the longitudinal centerline of the section. Formed in surface 30 and disposed axially relative to section 18 is a recess 31 which extends partially into the section. Such recess further is provided with an annular counterbore 32 and the section further is provided a plurality of circumferentially spaced fluid passageways 33 each disposed at an angle relative to the longitudinal centerline of section 18 and intercommunicating recess 31 and a threaded outlet 34 adapted to receive a spray nozzle 34a. Typically, front end face 35 of shaft head portion 25 is disposed substantially perpendicular to the axis of shaft 17 and is provided with a diameter slightly less than the diameter of counterbore 32 on mounting surface 30 of the head section so that the head section may be permanently attached to the main body section of shaft 17 by positioning head section 18 on front face 35 of the main body section of the shaft with the front end of head portion 25 seated within counterbore 32, and securing the head section to the main body section of the shaft. Preferably, the sections of the shaft are formed of a metal such as steel and the head section is welded to the main body section of the shaft.

With the head section affixed to the main body section of the shaft as described, a number of fluid passageways is provided in the shaft, each consisting of passageway 24 disposed axially relative to the main body section of the shaft, recess 31 disposed axially relative to the head section and at an angle relative to the axis of the main body section, communicating with passageway 24, and a passageway 33 disposed at an angle relative to the axis of the head section, intercommunicating recess 31 and a nozzle threaded into an outlet 34.

Each of devices 15 may be mounted on an inner wall member of frame 10 as shown in FIG. 2 by drilling a hole in the inner wall of a frame section, mounting plate 16 on the inner side of such wall with the opening 36 therein aligned with the hole in the wall and securing the mounting plate thereon with bolts or other suitable means, inserting shaft 17 with head section 18 secured on the front end thereof, through aligned openings in the inner wall and the mounting plate, placing spacer 19 on the inner end of shaft 17, and then extending the shaft into the opening provided in drive unit 20. The drive unit generally includes an electric motor 36 provided with an integrally mounted gear reducer 37 having an opening 38 through which the rear end of shaft 17 is inserted and operatively connected to the output of reducer 37. Drive unit 20 further is adapted to be supported within the section of the support frame and is provided with an inlet communicating with the passageway of shaft 17 which is connected to various sources of a cleaning agent, perhaps a wax solution and rinse water along with suitable valves and controls for supplying such liquids to such device in a predetermined sequence to provide a vehicle washing operation.

As previously indicated, a number of the devices as shown in FIG. 3 are positioned along the several sections of support frame 14 to dispense a plurality of liquid dispersions into space 14, following a number of orbital paths. In each of such devices, the liquid being dispensed will follow a path consisting of a first passageway section consisting of passageway 24 disposed along the longitudinal centerline of shaft 17, a second passageway section consisting of recess 31 disposed along the longitudinal centerline of head section 18 and at an angle to the first fluid passageway section and a plurality of third passageway sections each consisting of a passageway 33 disposed at an angle to the longitudinal centerline of the head member, and then through a plurality of nozzles dispersing the liquid in conical configurations. It will be appreciated that with the shaft member mounted thereon being rotated about the longitudinal centerline of the main body section of the shaft and the various angular displacements of the passageway sections in the shaft, each of the conical spray patterns of liquid dispersed by each of the nozzles will be caused to follow an orbital path and thus dispense streams of solution covering a circular or annular area, depending upon the configurations of the various passageways and the pressure applied to the solutions.

Device 40 shown in FIGS. 4 through 6 is similar in construction and operation to device 15 but provides alternate means for mounting the device on various sections of the support frame. The device includes a support bearing 41, a pair of mounting plates 42 and 43, a spacer 44, a drive unit 45 and a shaft 46 having a head section 47. Unit 40 is adapted to be mounted on an inner and outer side wall of a section of a support frame as shown in FIG. 5, with the drive unit being disposed on the exterior of the frame structure in contrast to a position within the frame section as shown in FIG. 2. Shaft 46 is comparable to shaft 17, providing an axial passageway 48 and having an enlarged portion 49 and a reduced main body portion 50. Head section 47 is similar to the head section shown in FIGS. 7 through 9 and is mounted on front face 51 of shaft 46 in the same manner as head section 18 is mounted on front face 35 of the main body portion of shaft 17. Drive unit 45 is similar to drive unit 20 and includes an electric motor 52 and a gear reducer 53 adapted to receive an end portion of shaft 46 and rotate the shaft about its longitudinal centerline.

In the mounting of device 40 on a leg section 54 of support frame 55 comparable to support frame 10, a pair of aligned holes are formed in inner and outer wall portions 56 and 57 of frame section 54, with a hole in wall 56 being large enough to accommodate the insertion of enlarged shaft portion 49 and the hole in outer wall 57 being large enough to accommodate the insertion of reduced main body portion 50 of shaft 46. Support bearing 41 is then mounted on inner wall 56 with the opening therein aligned with the opening in inner wall 56. Mounting plates 42 and 43 are then mounted on the exterior side of outer wall 57. Shaft 46 with end section 47 secured to the end thereof in the manner as previously described is then inserted through support bearing 41, the openings in inner and outer walls 56 and 57 and the openings in mounting plates 42 and 43. Spacer 44 is then mounted on reduced portion 50 of the shaft, the inlet in reducer 53 is aligned with shaft 46, the reduced portion 50 of the shaft is inserted into gear reducer 53 and operatively connected thereto to allow the gear reducer to impart rotary motion to the shaft and the drive unit is secured to outer wall 57. As in the previous embodiment, shaft 46 along with the shafts of similar units mounted on support frame 55 is connected to several sources of solutions including cleaning preparations, waxing solutions and rinse water which may be supplied to the various dispensing devices under pressure in various predetermined sequences to provide a desired vehicle washing operation.

Within the scope of the invention, the number of devices employed, the positioning of such devices, the angularities of the passageway sections of the shafts of the devices and the operating phases of the shafts of different devices may be varied to provide a multitude of dispersion patterns of solution applied in a vehicle cleaning operation. In all modes of operation, however, the orbital path of dispersion of solution will be certain to apply solution to a maximum amount of area of the vehicle, often reaching certain crevices untouched by conventional solution spraying devices. In one application of the invention, the axes of the main body sections of the shafts of an array of devices may be disposed radially relative to a longitudinal centerline of the system extending through opening 14. In addition, the angular dispositions of the shafts of such devices may be displaced so that the rotations of such shafts will be out of phase, and different devices of an array of such devices may be connected to different liquids being applied. Also, the pressure applied to the devices may be varied and the speeds of the motors of the devices may be varied to accommodate different liquid application operations.

Although it is preferred that the shafts of the devices be formed of metal which will resist corrosion caused by various solutions used, such shafts may be formed of other materials including suitable plastic materials. The shaft may be formed by providing a selected length of tubular bar stock and turning down a portion thereof to provide a main body section of the shaft including an enlarged head portion and a reduced portion; providing a short length of solid, round bar stock with parallel end faces disposed perpendicular to the axis thereof, drilling recess 31 in an end face thereof, drilling passageway sections 33 utilizing a suitable fixture, counterboring and tapping the outlets of passageway sections 33, milling the mounting surface on the rear end thereof and then counterboring recess 31 to provide the head section; positioning the head section on the enlarged portion of the main body section and welding the head section to the main body section; and then threading the spray nozzles in the threaded, enlarged outlets of passageway sections 31.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A liquid dispensing device mountable on a support frame, comprising:

a shaft provided with a longitudinally disposed first passageway section communicable at one end thereof with a source of liquid under pressure, a second passageway section communicating with said first passageway section and disposed at an angle relative thereto and a third passageway section communicating with said second passageway section, disposed at an angle relative to a longitudinal centerline of said second passageway section and having an outlet;

means for rotating said shaft about a longitudinal centerline thereof; and means for mounting said shaft and said means for rotating said shaft on said support frame, wherein said shaft comprises a tubular section having an annular end surface disposed perpendicular to the axis thereof, and a head section having a surface disposed at an angle relative to a longitudinal centerline thereof mated to said annular end surface of said tubular section, a longitudinally disposed recess in said angled surface, disposed along a longitudinal centerline of said head section, communicating with the interior of said tubular section and at least one passageway disposed at an angle relative to said longitudinal centerline of said head section intercommunicating said recess and an outlet port of said passageway.

2. A device according to claim 1 wherein said head section is welded to said tubular section.

3. A device according to claim 1 including a spray nozzle disposed in said outlet port.

4. A device according to claim 1 wherein said head section includes a plurality of passageways spaced circumferentially about said longitudinal centerline of said head section, each disposed at an angle relative to said longitudinal centerline of said head section and intercommunicating said recess and an outlet port.

5. A device according to claim 4 including a spray nozzle disposed in each of said outlet ports.

* * * * *